United States Patent
Joshi et al.

(10) Patent No.: US 6,516,065 B1
(45) Date of Patent: Feb. 4, 2003

(54) METHOD FOR IMPLEMENTING CIPHERED COMMUNICATION FOR SINGLE-HOP TERMINAL-TO-TERMINAL CALLS IN A MOBILE SATELLITE SYSTEM

(75) Inventors: Chandra Joshi, Gaithersburg, MD (US); Anthony Noerpel, Lovettsville, VA (US); Chi-Jiun Su, Derwood, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/247,848

(22) Filed: Feb. 11, 1999

Related U.S. Application Data

(60) Provisional application No. 60/110,261, filed on Nov. 30, 1998, now abandoned.

(51) Int. Cl.[7] ................................................. H04K 1/00
(52) U.S. Cl. ................................................... 380/270
(58) Field of Search ............................... 380/270, 272, 380/274, 247, 31, 33

(56) References Cited

U.S. PATENT DOCUMENTS

| | | |
|---|---|---|
| 4,688,250 A | 8/1987 | Corrington et al. |
| 5,526,404 A | 6/1996 | Wiedeman et al. ........... 379/60 |
| 5,594,780 A | 1/1997 | Wiedeman et al. ........... 379/59 |
| 5,664,006 A | 9/1997 | Monte et al. ................ 455/405 |
| 5,689,568 A | 11/1997 | Laborde ....................... 380/49 |
| 5,713,075 A | 1/1998 | Threadgill et al. ........... 455/427 |
| 5,715,297 A | 2/1998 | Wiedeman .................... 379/60 |
| 5,748,742 A | 5/1998 | Tisdale, et al. |
| 5,781,540 A | 7/1998 | Malcolm et al. ............. 370/321 |
| 5,809,141 A | 9/1998 | Dent |
| 5,822,311 A | 10/1998 | Hassan et al. .............. 370/322 |
| 5,825,889 A | 10/1998 | Dent |
| 5,842,125 A | 11/1998 | Modzelesky et al. ........ 455/426 |
| 5,850,602 A | 12/1998 | Tisdale et al. .............. 455/430 |
| 6,137,885 A | * 10/2000 | Totaro et al. ................ 380/247 |

FOREIGN PATENT DOCUMENTS

EP      0 851 628 A1      7/1998

* cited by examiner

*Primary Examiner*—Matthew B. Smithers
(74) *Attorney, Agent, or Firm*—John T. Whelan; Michael W. Sales

(57) ABSTRACT

A mobile satellite communication system is provided to control the transfer of a terminal for a single-hop call from at least one of a clear mode and a ciphered mode with respect to a gateway station to a ciphered mode with respect to a satellite link connecting the terminal with another terminal for a single-hop, terminal-to-terminal call using a cipher key and an encryption algorithm common to the terminal and the other terminal. Frame number offset data, which indicates a mapping delay between received and transmitted time slots at the satellite, is provided to both terminals in a terminal-to-terminal call for ciphering synchronization.

16 Claims, 7 Drawing Sheets

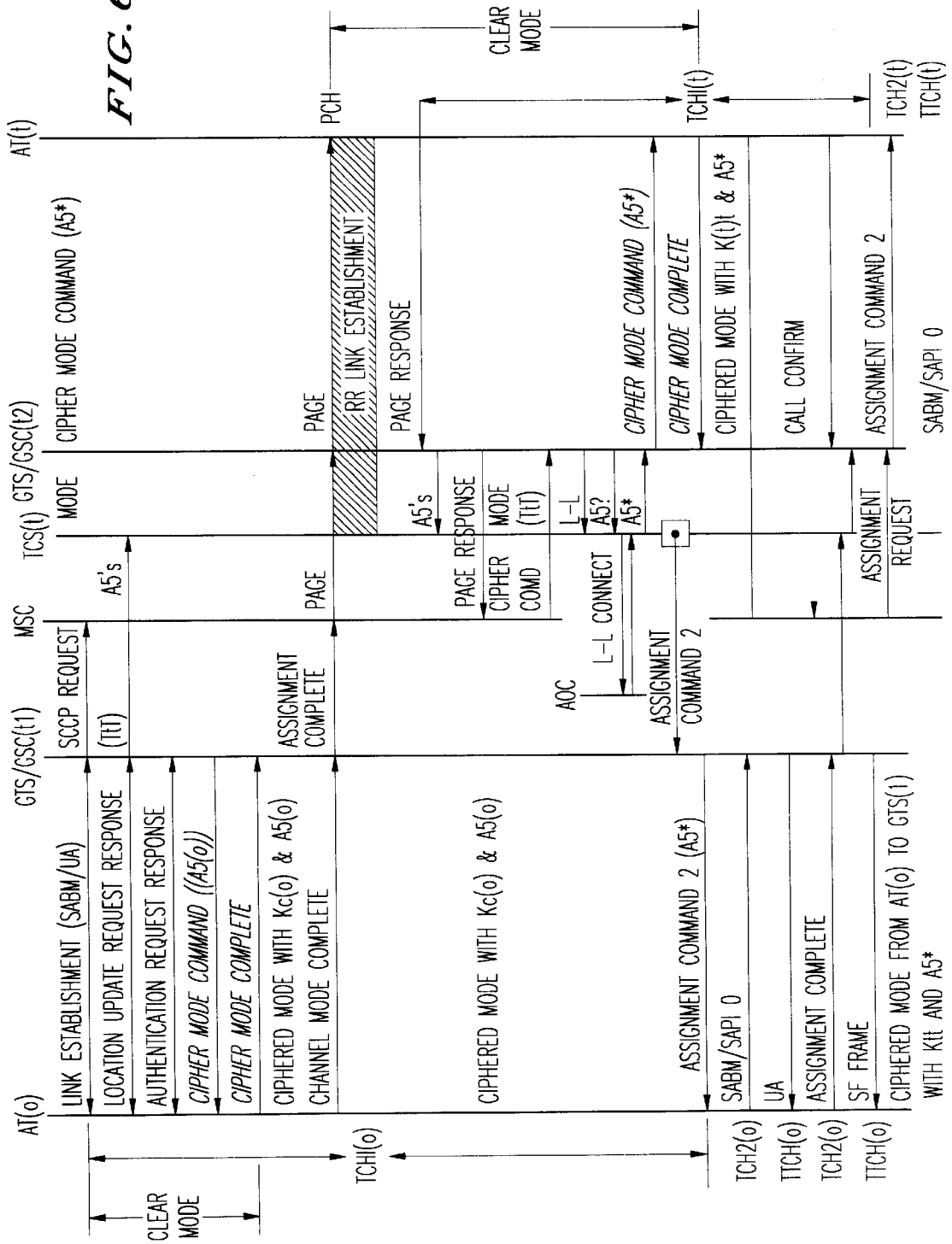

METHOD FOR IMPLEMENTING CIPHERED COMMUNICATION FOR SINGLE-HOP TERMINAL-TO-TERMINAL CALLS IN A MOBILE SATELLITE SYSTEM

This application claims priority to U.S. Provisional patent application Ser. No. 60/110,261 of Chandra Joshi et al., filed Nov. 30, 1998, for "A Method for Implementing a Terminal-To-Terminal Call in a Geo-Stationary Orbit Mobile Satellite System", incorporated herein by reference.

CROSS REFERENCE TO RELATED APPLICATIONS

Related subject matter is disclosed and claimed in co-pending U.S. patent application Ser. No. 09/115,098, filed by Chandra Joshi et al. on Jul. 13, 1998; in co-pending U.S. patent application Ser. No. 09/247,847, filed by Chandra Joshi et al. on Feb. 11, 1999, for "A Mobile Satellite System Method for Implementing a Terminal-To-Terminal Call"; and in co-pending U.S. patent application Ser. No. 09/247,845, filed by Chandra Joshi et al. on Feb. 11, 1999, for "A Method for Implementing a Terminal-To-Terminal. Call With the Optimal Use of Radio Resources In A Mobile Satellite System"; all of said applications being expressly incorporated herein by reference.

FIELD OF THE INVENTION

The invention relates to a method of providing end-to-end encryption during a single-hop, terminal-to-terminal call in a mobile satellite communication system.

BACKGROUND OF THE INVENTION

A number of systems exist which provide both mobile terrestrial communication (i.e., cellular communication) and mobile satellite communication between terminals. Such a system is hereinafter referred to as an MSAT system. Satellite communication between two terminals is typically implemented via a doublehop, that is, two signal paths. One signal path is from an originating terminal to a ground station via a satellite, and the other signal path is from the ground station to a destination terminal via the satellite.

A number of single-hop MSAT systems also exist; however, these systems are disadvantageous because they do not provide encryption for privacy during a single-hop terminal-to-terminal (TtT) call. Some systems that provide both single-hop and double-hop call modes can maintain ciphering for encryption in only the double-hop mode. The ciphering capability is lost when the TtT call is implemented in single-hop mode because the signaling paths between the terminals and their base stations are also lost. A need therefore exists for an MSAT system which provides end-to-end encryption for single-hop TtT calls.

SUMMARY OF THE INVENTION

In accordance with the present invention, a mobile satellite communication system is provided to control the transfer of a terminal for a single-hop call from at least one of a clear mode and a ciphered mode with respect to a gateway station to a ciphered mode with respect to a satellite link connecting the terminal with another terminal for a single-hop terminal-to-terminal call using a cipher key and an encryption algorithm common to the terminal and the other terminal.

In accordance with another aspect of the present invention, frame number offset data, which indicates a mapping delay between received and transmitted time slots at the satellite, is provided to both terminals in a terminal-to-terminal call for ciphering synchronization. A method is also provided for operating two terminals in an MSAT system in a ciphered mode with respect to transmissions therefrom to a corresponding gateway station. The cipher keys and encryption algorithms can be implemented independently of each other. This ciphered mode is changed at each terminal to a ciphered mode using a common cipher key and encryption algorithm for use during a single-hop, terminal-to-terminal call.

In accordance with an aspect of the present invention, the originating terminal transmits information to a terminating gateway station regarding encrpytion algorithms supported by the originating station. The terminating gateway station selects one of the encryption algorithms that is also supported by the other terminal and commands the two terminals to use the selected algorithm and a common key during the single-hop call.

In accordance with yet another aspect of the present invention, the originating terminal is reregistered with the terminating gateway station at which the terminating terminal is registered if the originating gateway station is different from the terminating gateway station.

In accordance with yet another aspect of the present invention, ciphering synchronization is implemented by providing the originating terminal and the terminating terminal with frame number offset data indicating a time slot mapping delay between transmissions received at and then transmitted from the satellite. The originating terminal and the terminating terminal use the frame number offset data with said selected encryption algorithm to generate frame-dependent number sequences for encryption.

In accordance with yet another aspect of the present invention, a message signal embodied in a carrier wave contains at least one of a plurality of segments comprising a segment having a common ciphering key for use between two terminals during a single-hop call, a segment for indicating assigned satellite channels for use by both of the terminals during the single-hop call, a segment indicating a signaling channel between one of the terminals and a corresponding gateway station, and a command segment instructing the terminal to activate the assigned satellite channels and to commence ciphering through the assigned satellite channels using the common ciphering key.

BRIEF DESCRIPTION OF DRAWINGS:

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
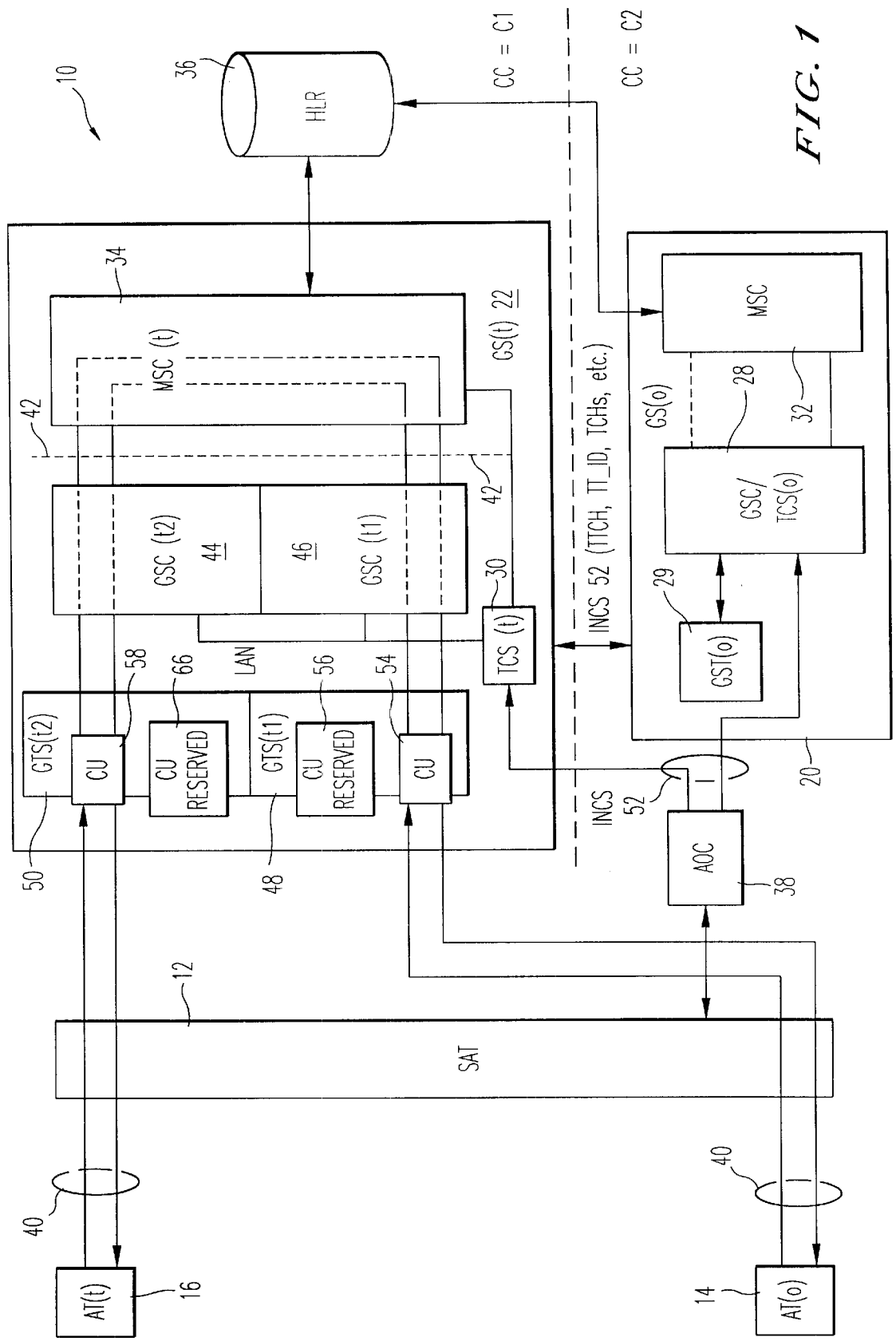
FIG. 1 is a block diagram of an MSAT system constructed in accordance with an embodiment of the present invention.

An MSAT system 10 constructed in accordance with the present invention is depicted in FIG. 1. The MSAT system 10 is a fully integrated digital mobile communications network which is interoperable with terrestrial cellular networks. The MSAT system 10 comprises at least one satellite 12 which preferably a geosynchronous satellite. While only one satellite is shown, it is to be understood that additional satellites can be used in the MSAT system 10.

The MSAT system 10 provides an open common air interface to allow access terminals such as AT(o) 14 and AT(t) 16 to communicate via the satellite 12. The air interface 40 can be, for example, an L-band mobile radio link. The access terminals (ATs) can be hand-held terminals, vehicular terminals or fixed terminals. In addition, the ATs can be dual-mode terminals to operate in either of the MSAT system or a Global System for Mobile Communications or GSM-standard digital cellular system. The MSAT system 10 provides subscriber services that are essentially those services available from a GSM-based digital cellular system, including voice, data, facsimile, voice mail and short message service, among other services.

With continued reference to FIG. 1, the MSAT system 10 further comprises a number of gateway stations (e.g., GS(o) 20 and GS(t) 22). The gateway stations (GSs) provide an interface between the public switched telephone network (PSTN), the public land mobile network (PLMN), and the public switched data network (PSDN) and the ATs using the satellite 12 as repeater. As stated previously, the GSs also have interfaces for cooperating cellular networks for interoperability. Thus, ATs communicate over the satellite with devices in the PSTN, PLMN and the PSDN via GSs and with each other under the control of GSs, as described in further detail below. The GSs preferably communicate via C-band satellite links. Single-hop and double-hop mobile TtT calls via the satellite are preferably implemented via L-band paths. For a single-hop direct connection or TtT call between access terminals, a cross-connected pair of L-band channels are used and are hereinafter referred to as an L-L link.

A satellite operations center (not shown) provides satellite telemetry, command and ranging and payload housekeeping functions. An advanced operations center (AOC) 38 communicates with the satellite operations center, as well as with the GSs. Each GS manages a subset of the satellite resources (i.e., switched channels) and can request additional resources from the AOC 38 as required.

System Architecture

The MSAT system 10 architecture is based on the GSM standard. Each GS preferably comprises at least one gateway station controller (GSC), a traffic control subsystem (TCS), and at least one gateway transceiver station (GTS). For illustrative purposes, an originating GS (i.e., GS(o) 20) comprises a GSC and a TSC which are hereinafter referred to as GSC(o) and TCS(o), respectively, and which are indicated generally at 28 in FIG. 1. The GS(o) also comprises a transceiver GTS(o) 29 and a mobile switching center (MSC) 32. A terminating GS (i.e., GS(t) 22) comprises two GTSs, that is, GTS(t1) 48 and GTS(t2) 50, as well as two GSCs hereinafter referred to as GSC(t1) 46 and GSC(t2) 44. The GSC(t1) 46 and GSC(t2) operate in conjunction with an MSC 34. Both of the MSCs 32 and 34 communicate with a home location register (HLR) 36 which operates in a conventional manner. The GSC and GTS manage an interface (i.e., an A interface 42) toward a MSC. The GTS provides the common air interface 40 with the ATs. The TCS provides for the allocation/deallocation of the radio resources to the AT via communication with the GSC/GTS. The TCS can support a number of GSCs in a GS, as illustrated in FIG. 1 by the TCS(t) 30 and the GS(t) 22 which comprises GSC(t1) 46 and GSC(t2) 44.

Figure 2:
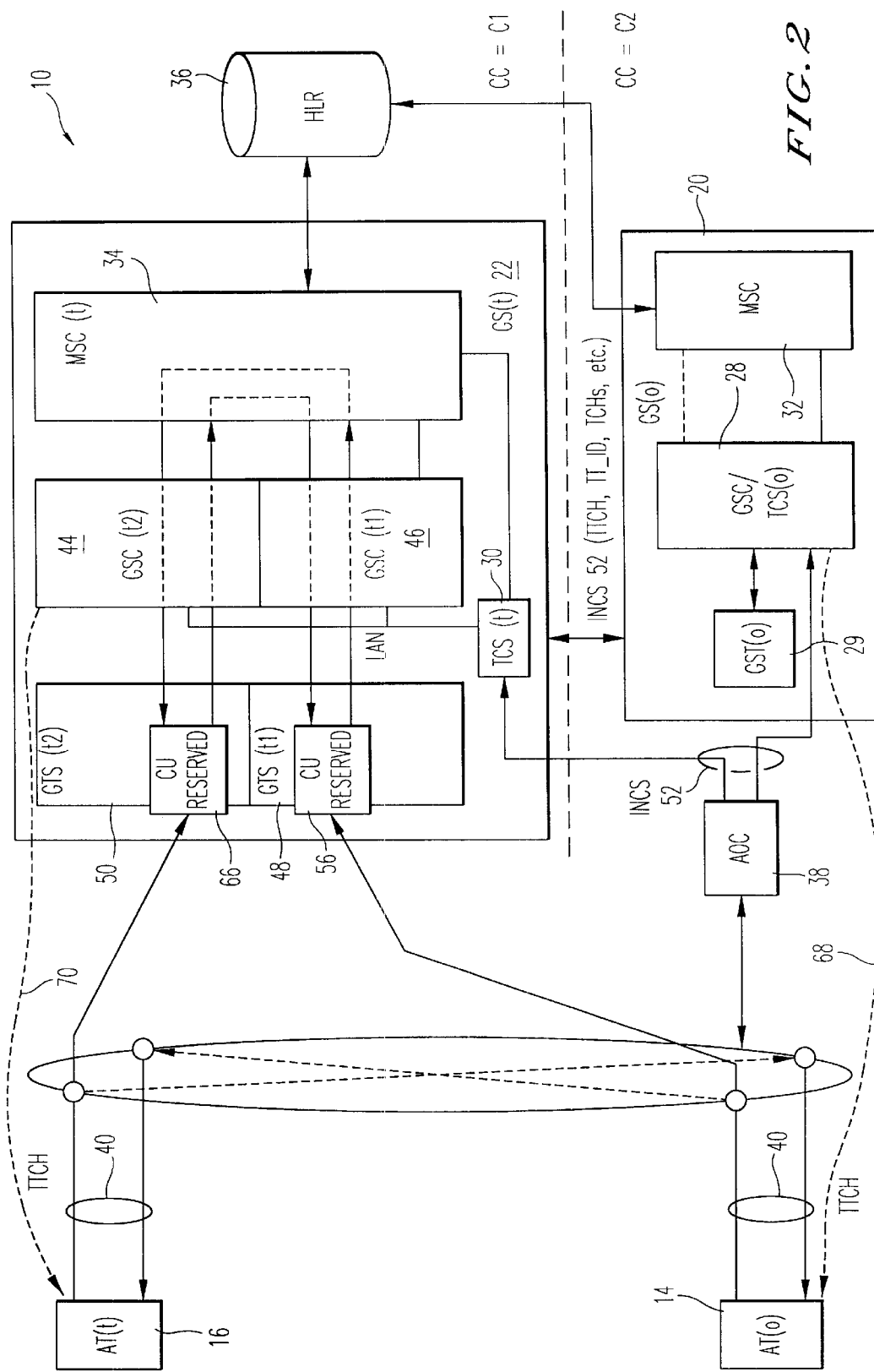
FIG. 2 is a block diagram of an MSAT system for implementing a TtT single-hop call in accordance with an embodiment of the present invention.

FIG. 1 illustrates channel units 54 and 58, as well as spare channel units 56 and 60, in the GTS(t1) 48 and GTS(t2) 50, respectively. Each channel unit (CU) represents a channel through which an AT communicates with the GS(t) 22. FIG. 2 is substantially the same as FIG. 1, except a reserved CU 64 is used by the AT(o) 14 and a reserved CU 66 is used by the AT(t) 16. FIG. 2 depicts the MSAT system 10 during a single-hop TtT call, as opposed to the double-hop mode depicted in FIG. 1. As illustrated in FIG. 2, communication of the MSC(t) 34 with the AT(o) 14 and the AT(t) 16 is blocked during a TtT call. As will be discussed in further detail below, the GS(o) 20 and the GS(t) 22 are operable in accordance with the present invention to assign signaling channels (TTCH) 68 and 70 with which these GSs can communicate with their respective ATs during a single-hop TtT call. The allocation of satellite resources by the AOC and GSs is communicated via an intranetwork communication system (INCS) 52.

As stated previously, a TtT call in the MSAT system 10 can be established in either single-hop mode or double-hop mode. The single-hop mode call is preferably only established for a voice call since the aforementioned propagation delay is less acceptable for voice calls than data calls. In this mode, two ATs engaged in a voice call communicate directly via satellite 12 on a circuit-switched L-L channel at the satellite 12. The TtT double-hop mode call is established between two ATs for data, facsimile, and some voice calls when the ATs are in geographically restricted positions. The MSAT system supports two types of TtT double-hop calls, that is, when only one GS is in use and both ATs are registered at this GS, and when two GSs are in use and each AT is registered at a different GS. The MSAT system 10 supports a single-hop call for terminals even if both of the terminals are roaming in the MSAT system. One or two GSs will establish two independent connections with each AT by using two independent ciphering keys (Kc1, Kc2). The terminating GSC(t) initiates a procedure for early assignment of traffic channels to terminals. In this procedure, the GSC(t) requests the AOC 38 to cross-connect a new pair of L-L channels at the satellite 12 for establishment of a single-hop AT-AT call in the network. On completion of the L-L switchover procedure, the GSC(o) 28 and the GSC(t1) 46 initiate a subsequent terminal-to-terminal channel (TTCH) assignment procedure, which includes the transfer of the common ciphering key (Ktt), assignment of the TTCH and L-L channels (i.e., traffic channels or TCHs) connected at the satellite 12 to both ATs and the GSs and additional parameters for the ciphering synchronization. On successful completion of the TTCH assignment procedure, a single-hop voice call is established. The AT and corresponding GS begins to perform the signaling, power control, and timing correction for the call over the assigned channel (i.e., the TTCH, and the traffic channel [TCH]).

Ciphering

In the MSAT system 10, protection of data against unauthorized eavesdropping is achieved by the use of encryption at the physical layer before data transmission via the air interface. Ciphering is done at the transmitting side by performing the exclusive-OR operation between a burst of data and a pseudorandom sequence of the same length. Deciphering at the receiving side (e.g., AT(t) 16) follows the identical operation since data is not changed twice by exclusive-ORing). Two 114-bit pseudorandom sequences are preferably used for ciphering, known as S1 and S2. The lengths of the sequences S1 and S2 are different for different sizes of data bursts that are to be encrypted (e.g., 212 bits for an NT3 burst); however, the length of both sequences S1 and S2 is identical to the size of the data burst that is to be ciphered. The use of sequences S1 and S2 are different on the mobile (i.e., AT) side and the network (i.e., sequences, GS/MSC/HLR) side. Sequences S1 and S2 are used for ciphering and deciphering on the mobile side, respectively, while the opposite is done on the network side. During a TtT call, an AT can act as the network, and the network can act as a mobile AT in terms of using the sequences S1 and S2 for ciphering.

Figure 3A:
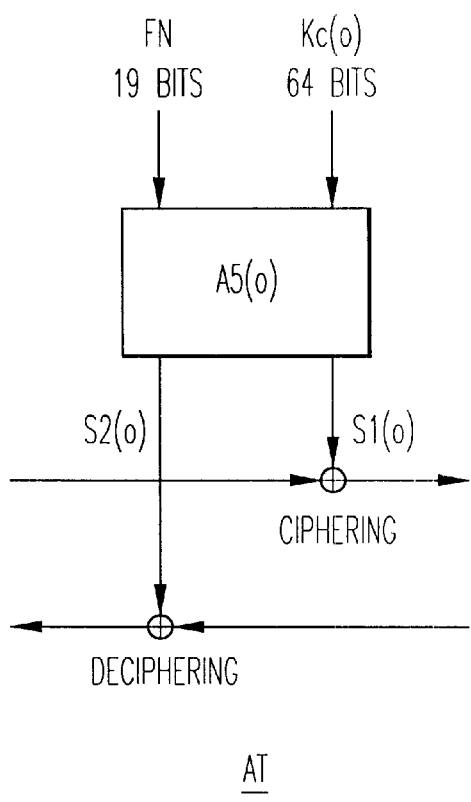
FIG. 3 illustrates ciphering using an independent cipher key between an originating terminal and a gateway station in accordance with an embodiment of the present invention.
Figure 3B:
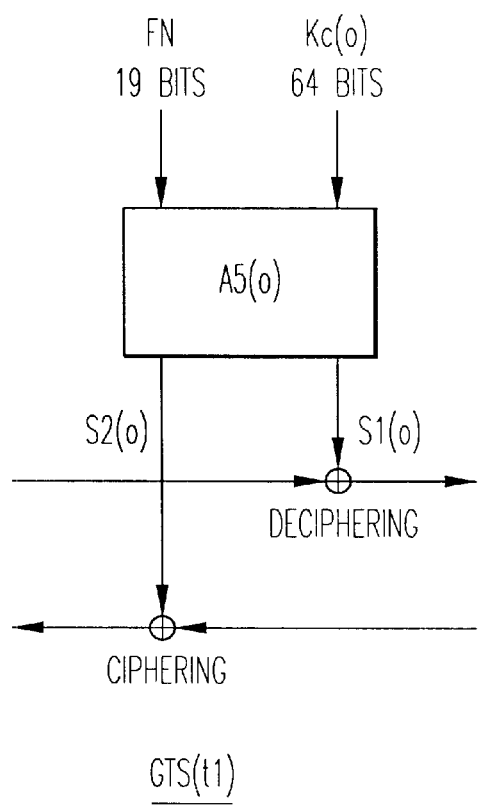

An example of ciphering and deciphering with the use of the key Kc(o) and the algorithm A5(o) between AT(o) and GTS(t1) is shown in FIG. 3. With reference to FIG. 3, an encryption algorithm (e.g., A5) is used to generate two pseudorandom sequences, S1 and S2, and resides at the AT and the GTS (e.g., the AT(o) 12 and the GTS(t1) 48). The AT and the GTS can have more than one A5 algorithm implemented inside them. In this case, the GSC (e.g., GSC(t1) 46) selects the A5 algorithm common to both of them. The inputs to the algorithm A5 are the 19-bit frame number N) and the 64-bit cipher key Kc (or Ktt for TtT call), and the A5 generates the two pseudo random sequences S1 and S2. Therefore, both S1 and S2 are changed for every frame.

In a usual TtG call, there are only two modes of transmission, namely clear mode and ciphered mode. Every call preferably begins with the clear mode transmission, and is changed into ciphered mode by performing ciphering mode setting procedures typically after the authentication.

For a TtT call, the mode of the transmission takes place twice instead of once. The mode of operation changes from clear text mode to ciphered mode with the use of different keys by each AT (e.g., AT(o) 14 and AT(t) 16) during the TtT call set-up phase with the MSAT network, as in normal call procedures. The mode of operation changes from ciphering with independent keys Kc to ciphering with a common key Ktt.

Figure 4:
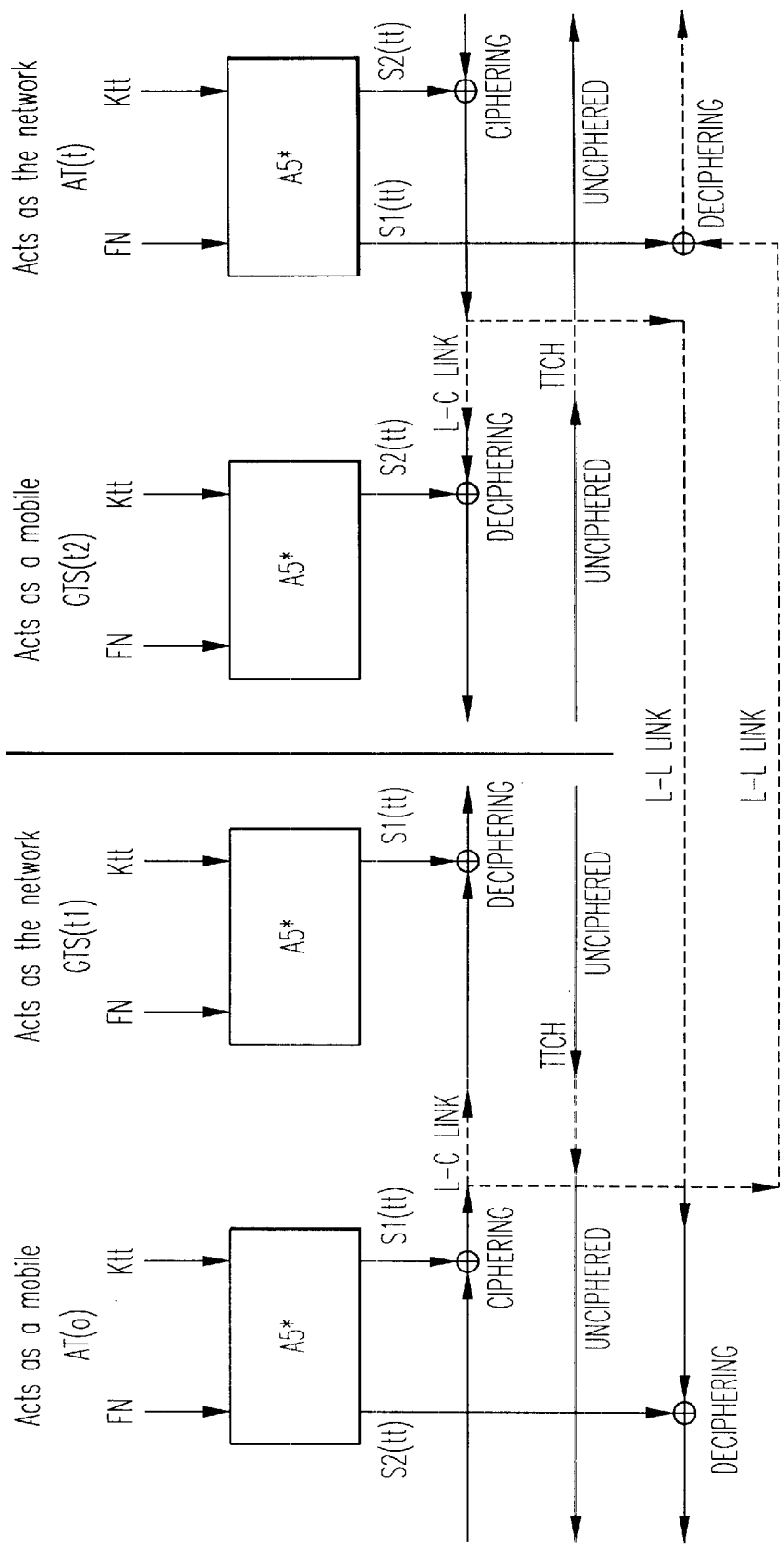
FIG. 4 illustrates a ciphered mode in an MSAT system during a single-hop TtT call in accordance with an embodiment of the present invention.

During a TtT call procedure, there are preferably four different modes of transmission, starting from the clear mode and ending with the ciphered mode using the TtT common key, Ktt, and the TtT common algorithm A5* between AT(o) 14 and AT(t) 16, as depicted in FIG. 4. The modes are (1) unciphered mode between the AT(o) and GTS/GSC(t1) and between AT(t) and GTS/GSC(t2); (2) ciphered mode with the independent keys (i.e., Kc(o) and A5(o) between AT(o) and GTS(t1), and Kc(t) and A5* between AT(t) and GTS(t2)); (3) ciphered mode with the common key Ktt for a TtT call and A5* from AT(o) to GTS(t1); and (4) ciphered mode with Ktt and A5* from AT(t) to GTS(t2) and between the ATs (i.e., the AT(o) 14 and the AT(t) 16). The signaling that triggers the change of transmission mode is also shown with the arrows in FIG. 5. The change of transmission modes during the TtT call procedure is shown in more detail in FIG. 6.

Unciphered Mode Between AT(o) and GTS/GSC(t1)

Figure 6B:
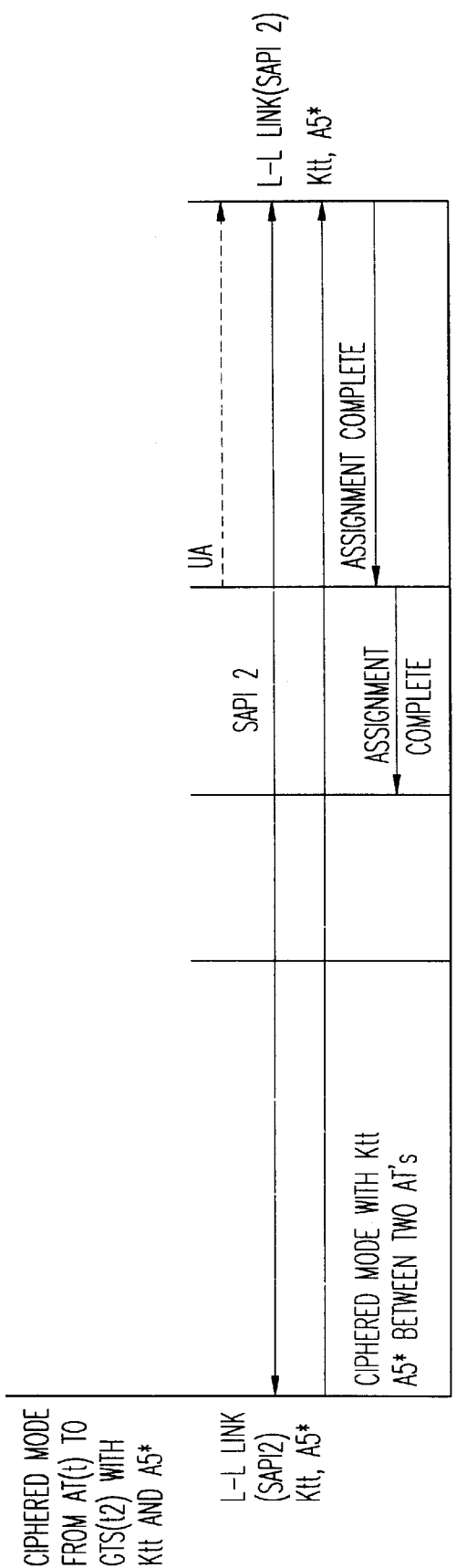
FIG. 6 illustrates signals transmitted between MSAT system components to transition to a common key ciphered mode during a TtT call in accordance with an embodiment of the present invention.

The AT(o) 14 communicates in clear mode with GTS/GCS(t1), starting from CHANNEL REQUEST. In the case with two GSs, the AT(10) is in clear mode with GTS/GCS(o) until it receives the CIPHER MODE COMMAND similar to the GSM call procedure, as shown in FIG. 6. The LOCATION UPDATE REQUEST/CM SERVICE REQUEST contains the mobile station classmark information element that carries the information on the versions of the encryption algorithm A5 that the AT(o) 14 supports. The GSC(t1) 46 can also support more than one version of the A5 algorithms. GSC(t1) selects one of the mutually acceptable versions of the A5 algorithm for use on that connection.

GCS(t1) notifies TCS(t) about the versions of the A5 algorithms that the AT(o) supports after it has received the LU REQUEST/CM SERVICE REQUEST from AT(o). The TCS(t) stores this information so that it can select the version of the A5 algorithm common to both AT(o) and AT(t) at a later time. The CIPHER MODE COMMAND from GTS(t1) triggers the cipher mode setting procedure, and the transmission mode between AT(o) and GTS(t1) is changed from clear mode to ciphered mode with key Kc(o) and algorithm A5(o), where Kc(o) is the cipher key of AT(o) and A5(o) is the encryption algorithm GSC(t1) selects for the ciphering of the connection.

Unciphered Mode Between AT(t) and GTS/GSC(t2)

The communication between AT(t) and GTS(t2) starts from clear mode after AT(t) receives the PAGE REQUEST. The clear mode connection is changed to ciphered mode after AT(t) receives the CIPHER MODE COMMAND from GTS(t2).

From the PAGE RESPONSE received from AT(t), GSC(t2) finds out the versions of the A5 algorithm that AT(t) supports and transfers the information to TCS(t). When GSC(t2) receives the CIPHER MODE COMMAND from the MSC 34, it issues the A5 algorithm inquiry (in addition to the L-L CONNECT REQUEST) to TCS(t) to find out the version of the A5 common to both AT(o) and AT(t). Because TCS(t) stores the versions of the A5 algorithms that both AT(o) and AT(t) support, it selects one of the versions of the A5 algorithms that is mutually acceptable to both AT(o) and AT(t), and preferably the algorithm that AT(o) and GSC(t1) are currently employing. The TCS(t) replies to GSC(t2) with the selected A5 version. If there is no A5 algorithm common to both AT(o) and AT(t), the call go to double-hop mode.

After GSC(t2) obtains the version of the A5 it is going to use with AT(t), it sends the CIPHER MODE COMMAND to AT(t) to start the cipher mode setting procedure and goes into ciphered mode with AT(t)'s key, Kc(t), and the selected A5 algorithm, A5*.

Ciphered Mode with Kc(o) and A5(o) Between AT(o) and GTS(t1)

Ciphering with key, Kc(o), and algorithm, A5(o), between AT(o) and GTS(t1) is shown in FIG. 3. The ciphered mode with Kc(o) and A5(o) between AT(o) and GTS(t1) remains until an ASSIGNMENT COMMAND 2 is issued to AT(o) from GSC(t1). The remaining portion of the mobility management (MM) procedure and most of the call control (CC) procedure are performed in this ciphered mode.

Ciphered Mode wit Ktt and A5* from AT(o) to GTS(t1)

After GCS(t2) receives the CIPHER MODE COMMAND with the TtT container from MSC, it sends the L-L CONNECT REQUEST to TCS(t), which in turn issues a request to AOC. If the AOC determines that the resource is available, it notifies the TCS(t) about the successful L-L connection at the satellite 12. TCS(t) then signals GSC(t1) to perform the TtT subsequent channel assignment procedure on AT(o). GSC(t1) initiates the TtT subsequent channel assignment procedure by issuing an ASSIGNMENT COMMAND 2 message to AT(o).

The ASSIGNMENT COMMAND 2 message contains the common TtT ciphering key, Ktt, the TCS(t)-selected algorithm, A5*, the use of S1 and S2 for ciphering and deciphering, frame number decrement indicator, and L-L channel and TTCH channel parameters. The AT(o) RR layer deactivates old resources and the old ciphering key and algorithm, activates the L-L and TTCH channels and Ktt and A5*, and initiates the new ciphered mode with Ktt and A5* through the new TCH channel to GSC(t1).

The ciphered mode with Ktt and A5* from AT(o) to GTS(t1), as shown in FIG. 4, remains during the rest of the call for signaling and interception purposes. In this example, S2 is assumed to be used for ciphering and S1 for deciphering at AT(o).

This ciphered mode is asymmetric, because ciphering is done only from AT(o) to GTS(t1) through the newly assigned TCH, and the other direction from GTS(t1) to AT(o) is left unciphered due to the use of a point-to-multipoint TTCH channel.

This ciphered mode begins when AT(o) sends set asynchronous balance mode (SABM) signal with service access point identifier (SAPI 0) to GTS(t1). GTS(t1) then responds to AT(o) with an unnumbered acknowledge (UA) in unciphered mode through the TTCH 68. The successful receipt of UA by AT(o) verifies the valid connection (ciphered TCH from AT(o) to GTS(t1) and unciphered TTCH from GTS(t1) to AT(o)) between AT(o) and GTS(t1). After receiving UA from GTS(t1), AT(o) concludes the TtT subsequent channel assignment procedure by sending ASSIGNMENT COMPLETE to GTS(t1), which in turn signals to TCS(t). TCS(t) notifies GSC(t2) about the success of the TtT subsequent channel assignment procedure on AT(o). When GSC(t2) receives the assignment request from MSC, GSC(t2) initiates the TtT subsequent channel assignment procedure on AT(t) by sending ASSIGNMENT COMMAND 2 message to AT(t), thereby triggering the ciphered mode with Ktt and A5* from AT(t) to GTS(t2).

The ciphered mode with Ktt and A5* is extended between AT(o) and AT(t) after AT(o) receives SABM with SAPI 2 from AT(t).

Ciphered Mode with Kc(t) and A5* Between AT(t) and GTS(t2)

Ciphering with Kc(t) and A5* between AT(t) and GTS(t2) is similar to ciphering with Kc(o) and A5(o) between AT(o) and GTS(t1), as shown in FIG. 4. This ciphered mode is maintained until AT(t) receives ASSIGNMENT COMMAND 2 from GSC(t2).

Ciphered Mode with Ktt and A5* from AT(t) to GTS(t2) and Between AT(o) and AT(t)

After receiving ASSIGNMENT COMMAND 2 from GTS(t2) as shown in FIG. 6, AT(t) sends SABM signal with SAPI 0 to GTS(t2) and SABM with SAPI 2 to AT(o) through to the newly assigned TCH. AT(o) and GTS(t2) respond to the SABMs with UA to AT(t) through the L-L link and TTCH, respectively. The successful exchange of SABM and UA with SAPI 0 between AT(t) and GTS(t2) verifies the TCH (L-to-C link) from AT(t) to GTS(t2) and the TTCH from GTS(t2) to AT(t). The exchange with SAPI 2 confirms the successful ciphered connection through L-L link.

The use of S1 and S2 for each AT is contained in ASSIGNMENT COMMAND 2. As shown in FIG. 4, if AT(o) is instructed to act as a mobile, S1 is used for ciphering and S2 is for deciphering. S1 and S2 are used for deciphering and ciphering respectively at AT(t), which acts as the network. Then, S1 is used for deciphering at GTS(t1), which acts as the network, and S2 is used for deciphering at GTS(t2), which acts as an AT. There is preferably no ciphering on the TTCH from GTSs to ATs.

Figure 5:
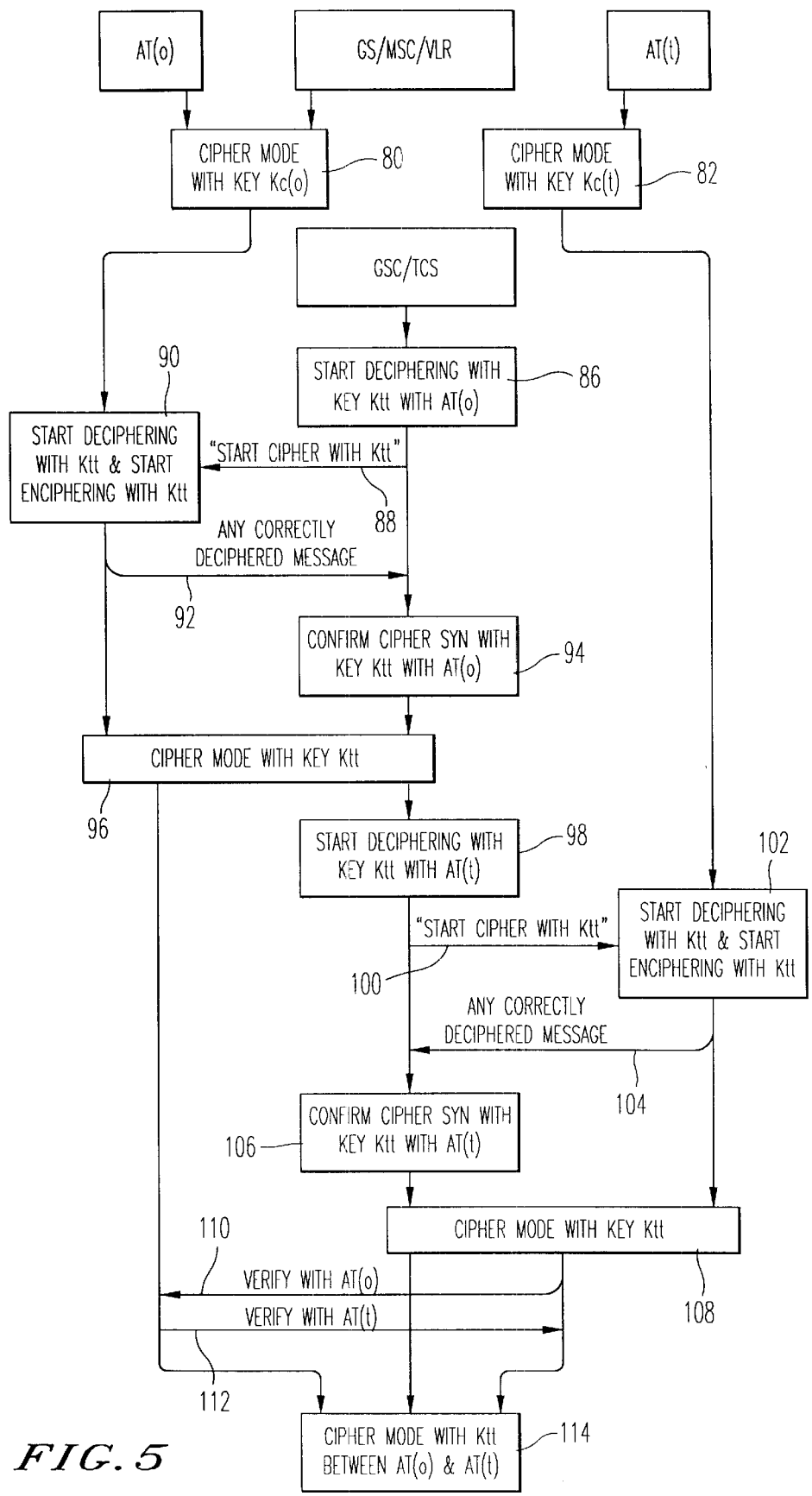
FIG. 5 is a flowchart depicting a sequence of operations for implementing a ciphered mode connection during a TtT call in accordance with an embodiment of the present invention.

Due to the timeslot mapping delay at the satellite L-L switch, the timeslots at which the satellite receives and those at which the satellite transmits may not be in the same frame. The frame number of the receive (RX) timeslots and that of the transmit (TX) timeslots for TtT connection at the satellite may differ at most by one. If the RX timeslots are in frame N, the TX timeslots are either in frame N or frame N+1. This frame number slip information is known after the timeslot assignment for a TtT call and it is sent to both ATs as frame number offset IE (1 bit, whether the current frame number will be decrement or not) in the ASSIGNMENT COMMAND 2 message. The receiving side of both ATs implement frame number decrementation based on the frame number offset IE, starting from the SABM/UA exchange with SAPI 2. There is no frame number slip issue in the L-C links from AT(o) to GTS(t1) and from AT(t) to GTS(t2). The change of cipher mode to start the enciphering and deciphering process is illustrated in FIG. 5. The cipher mode with key Kc(o) between AT(o) (block 80) and the network is changed into the cipher mode with the key Ktt first. Deciphering with Ktt starts in the GS (block 86), which sends in ciphered text with key Kc(o) to the AT(o) a specific message, that is, "Start cipher with Ktt" (block 88). Both the ciphering and deciphering start on the AT(o) side after the message "Start cipher with Ktt" has been correctly received by the AT(o) (block 90). Ciphering synchronization between AT(o) and the GS is confirmed when a frame or a message from the AT(o) has been correctly deciphered at the GS (blocks 92 and 94).

After the cipher mode with key Ktt between AT(o) and the GS has been established successfully (block 96), the same procedure used between AT(o) and the GS is performed between AT(t) and the GS (blocks 82, 98, 100, 102 and 104, respectively). When a frame or a message from the AT(t) has been correctly deciphered at the GS, ciphering synchronization between AT(t) and the GS is confirmed (blocks 106 and 108). At this stage, both ATs have already turned on the cipher operation with key Ktt, both at the transmitters and the receivers (blocks 110, 112 and 114).

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A single-hop method of providing end-to-end encryption between two terminals in a mobile satellite system during a single-hop terminal-to-terminal call comprising the steps of:

operating each of said two terminals in an independent ciphered mode for transmissions therefrom to at least one gateway station with which each of said two terminals have established a communication link, each of said two terminals employing cipher keys independently of each other for deciphering of respective said transmissions to said at least one gateway station; and switching said two terminals to an end-to-end cipher mode employing a common cipher key and selected encryption algorithm with respect to said two terminals for deciphering respective said transmissions to each other on a direct satellite communication link between said two terminals.

2. A method as claimed in claim 1, wherein said at least one gateway station comprises a first transceiver for communicating with said first terminal and a second transceiver for communicating with said second terminal, and a traffic control system for managing resources of said satellite allocated to said at least one gateway station, and further comprising the steps of:

transmitting data from said first terminal to said first transceiver and to said traffic control system relating to encryption algorithms supported by said first terminal; and transmitting a cipher mode command from said first transceiver to said first terminal to commence ciphered communication with said first transceiver using the corresponding one of said cipher keys and one of said encryption algorithms.

3. A method as claimed in claim 2, further comprising the steps of:

transmitting data from said second terminal to said second transceiver and to said traffic control system relating to encryption algorithms supported by said second terminal;

querying said traffic control system to determine said selected encryption algorithm to be one of said encryption algorithms that is supported by both said first terminal and said second terminal; and transmitting a cipher mode command from said second transceiver to said second terminal to commence ciphered communication with said second transceiver using the corresponding one of said cipher keys and said selected algorithm.

4. A method as claimed in claim 3, further comprising the steps of:

commanding said traffic control system to request establishment of said direct satellite communication link;

sending a channel assignment command from said first transceiver to said first terminal to commence channel assignment to said direct satellite communication link, said command having at least one of a plurality of data comprising said common cipher key, said selected encryption algorithm, at least one number sequence for ciphering and deciphering, satellite channels for establishing said direct satellite communication link, and a signaling channel for use between said first terminal and said first gateway station during said terminal-to-terminal call; and operating said first terminal in a ciphered mode with respect to said first transceiver using said common cipher key, said selected encryption algorithm, and said satellite channels.

5. A method as claimed in claim 4, further comprising the step of operating said second terminal in a ciphered mode with respect to said second transceiver using said common cipher key and said selected encryption algorithm, and said satellite channels.

6. A method as claimed in claim 5, wherein said switching step comprises the step of sending a signal between said first terminal and said second terminal on said direct satellite communication link using said common cipher key and said selected encryption algorithm to verify successful ciphering on said direct satellite communication link.

7. A method as claimed in claim 1, further comprising the steps of:

providing said first terminal and said second terminal with frame number offset data indicating a time slot mapping delay between receiving said transmissions at said satellite and transmitting said transmissions via said direct satellite communication link, said first terminal and said second terminal using said frame number offset data with said selected encryption algorithm during said ciphered mode with said first transceiver and said second transceiver, respectively, using said common cipher key and the respective one of said communication link; and verifying ciphering synchronization using said common cipher key prior to communicating via said direct satellite communication link by confirming when one of said transmissions from each of said first terminal and said second terminal has been correctly deciphered at said at least one gateway station using said common cipher key.

8. A method of providing end-to-end encryption between two terminals in a mobile satellite communication system during a single-hop terminal-to-terminal call comprising the steps of:

operating each of a first terminal and a second terminal in an independent ciphered mode for transmissions therefrom to a first gateway station and a second gateway station with which said first terminal and said second terminal have established a first communication link and a second communication link, respectively, each of said first terminal and said second terminal employing cipher keys independently of each other for deciphering of respective said transmissions to said first gateway station and said second gateway station; and switching both of said first terminal and said second terminal to an end-to-end cipher mode employing a common cipher key and encryption algorithm to said first terminal and said second terminal for deciphering respective said transmissions to each other on a direct satellite communication link between said first terminal and said second terminal.

9. A method as claimed in claim 8, wherein said switching step comprises the steps of:

registering both said first terminal and said second terminal with said second gateway station;

sending data to said second gateway station from said first terminal relating to encryption algorithms supported by said first terminal;

selecting one of said encryption algorithms common to both said first terminal and said second terminal;

sending a signal from said second gateway station to said first gateway station indicating at least one of a plurality of data comprising said common cipher key, said selected encryption algorithm, at least one number sequence for ciphering and deciphering, satellite channels for establishing said direct satellite communication link, and a signaling channel for use between at least one of said first terminal and said first gateway station and said second terminal and said second gateway station during said terminal-to-terminal call; and operating said first terminal in a ciphered mode with respect to said second gateway station using said common cipher key and said selected encryption algorithm.

10. A method as claimed in claim 9, further comprising the step of performing ciphering synchronization between said first terminal and said second gateway station after said common cipher key is received.

11. A method as claimed in claim 9, wherein said sending step comprises the step of transmitting frame number offset data to said first terminal indicating a time slot mapping delay between receiving said transmissions at said satellite and transmitting said transmissions via said direct satellite communication link, said first terminal using said frame number offset data with said selected encryption algorithm.

12. A method as claimed in claim 9, operating said second terminal in a ciphered mode with respect to said second gateway using said common cipher key and said selected encryption algorithm prior to establishing said direct satellite communication link.

13. A method as claimed in claim 9, further comprising the steps of
    providing both said first terminal and said second terminal with frame number offset data a time slot mapping delay between receiving said transmissions at said satellite and transmitting said transmissions via said direct satellite communication link, said first terminal and said second terminal using said frame number offset data with said selected encryption algorithm; a
    verifying ciphering synchronization using said common cipher key prior to communicating via said direct satellite communication link by confirming when one of said transmissions from each of said first terminal and said second terminal has been correctly deciphered at said second gateway station using said common cipher key.

14. A method as claimed in claim 9, wherein said ciphering synchronization is verified when said second gateway station correctly deciphers one of said transmissions from said first terminal.

15. A data signal embodied in a carrier wave comprising a command segment to instruct a terminal in a mobile satellite communication system to transfer from at least one of a clear mode and a ciphered mode with respect to a gateway station to a ciphered mode with respect to a satellite link connecting said terminal with another terminal for a single-hop terminal-to-terminal call using a cipher key and an encryption algorithm common to said terminal and said another terminal.

16. A data signal embodied in a carrier wave comprising at least one of a plurality of segments comprising a segment having a common ciphering key for use between two terminals during a single-hop call, a segment for indicating assigned satellite channels for use by both of said terminals during said single-hop call, a segment indicating a signaling channel between one of said terminals and a corresponding gateway station, and a command segment instructing one of said terminals to activate the assigned satellite channels and to commence ciphering through said assigned satellite channels using said common ciphering key.

* * * * *